United States Patent Office 3,024,202
Patented Mar. 6, 1962

3,024,202
STABILIZED TRIS(HYDROXYMETHYL)NITRO-
METHANE COMPOSITION
Lawrence R. Jones, Terre Haute, Ind., assignor to Commercial Solvents Corporation, New York, N.Y., a corporation of Maryland
No Drawing. Filed May 25, 1959, Ser. No. 815,332
2 Claims. (Cl. 252—397)

My invention relates to stabilized tris(hydroxymethyl) nitromethane compositions and, more particularly, it relates to tris(hydroxymethyl)nitromethane compositions stabilized with sodium bisulfite and the method of producing same.

Tris(hydroxymethyl)nitromethane is a white crystalline solid derived from the condensation of nitromethane with formaldehyde. It is generally quite stable when dry and pure. It is likewise generally quite stable in solution form, but even traces of salts of strong bases with weak acids, or alkaline materials in general, cause decomposition with slow release of formaldehyde. An increase in the pH and/or the temperature of the solution accelerates the rate of decomposition of the tris(hydroxymethyl) nitromethane. While this property makes tris(hydroxymethyl)nitromethane an unusually convenient formaldehyde donor, this instability renders the material commercially unsuitable for many other uses where it is potentially valuable.

One of the problems in metal working industries is the susceptibility of cutting oils (which are emulsions of oil and water) to bacteria attack. Tris(hydroxymethyl)nitromethane has been shown to be effective in completely inhibiting growth of bacterial flora in such compositions. however, is limited under certain circumstances by the excessively rapid decomposition of the tris(hydroxymethyl)nitromethane.

Tris(hydroxymethyl)nitromethane is of value also in other compositions and processes where microbiological control is required, such as is the cosmetic, paper and pulp, and other industries, particularly where used in the form of aqueous emulsions. It is a particular object of my invention to provide tris(hydroxymethyl)nitromethane compositions of increased stability for such uses where the rapid decomposition thereof would make the material unsuitable for such purposes.

I accomplish the stabilization of tris(hydroxymethyl) nitromethane by thoroughly incorporating therewith an amount of sodium bisulfite sufficient to reduce the rate of decomposition of the tris(hydroxymethyl)nitromethane to the required degree. The amount of the sodium bisulfite which I incorporate in the tris(hydroxymethyl) nitromethane compositions depends upon the use to which the composition is to be applied, inasmuch as for some uses and under some circumstances the desired effect of the composition is actually obtained by a slow and regulated liberation of formaldehyde by the decomposition of the tris(hydroxymethyl)nitromethane. By the use of increased amounts of sodium bisulfite the rate of the decomposition of the tris(hydroxymethyl)nitromethane is reduced to a minimum or even substantially completely inhibited. I accordingly, therefore, use varying amounts of sodium bisulfite depending upon the particular use and circumstances under which the tris(hydroxymethyl) nitromethane composition is used. For example, if increased stability is required at higher temperatures and over more extended periods of time, a greater proportion of sodium bisulfite will be required than if the composition is either stored or used at lower temperatures and stability for more extended periods of time is not required. I have found, for example, that when tris(hydroxymethyl) nitromethane compositions are to be used for their bactericidal effects, a satisfactory degree of stability is generally obtained by thoroughly incorporating with the tris-(hydroxymethyl)nitromethane composition an amount of sodium bisulfite ranging from 1 to 2%, and preferably 1.5% by weight, based on the weight of tris(hydroxymethyl)nitromethane-containing solution. When the compositions are to be used for purposes other than their bactericidal effects, amounts of sodium bisulfite ranging from 1–2% can be used.

The sodium bisulfite can be incorporated in my stabilized tris(hydroxymethyl)nitromethane compositions by any suitable means which permit thorough mixing of the sodium bisulfite into the composition. A convenient and at the same time generally satisfactory, method consists of thoroughly mixing an aqueous solution of sodium bisulfite of any desired concentration with the tris(hydroxymethyl)nitromethane composition, in aqueous emulsion or other suitable form, the aqueous solution of the sodium bisulfite being of such concentration as to permit thorough mixing of the latter with the tris(hydroxymethyl)nitromethane compositions without undesirably affecting the composition or concentration of the latter.

The effect of varying amounts of sodium bisulfite on the stability of tris(hydroxymethyl)nitromethane compositions at varying pH's and temperatures is shown by the tables given below.

Table I below shows the rate of decomposition of unstabilized tris(hydroxymethyl)nitromethane at 25° C. at varying pH's and over different time periods. Table II below shows the same type of information obtained at 40° C. and Table III shows similar results obtained at 60° C. The results shown in each table were obtained by preparing aqueous buffer solutions of pH 4.0, 6.0, 7.5, 8.0, 8.5 and 9.0 from appropriate mixtures of stock solutions prepared to contain 5% of either phosphoric acid ($H_3PO_4$), monobasic potassium phosphate ($HK_2PO_4$), dibasic potassium phosphate ($K_2HPO_4$), or tribasic potassium phosphate ($K_3PO_4$). Tris(hydroxymethyl)nitromethane solutions were prepared in these buffers so that the concentration of the tris(hydroxymethyl)nitromethane equalled 1%. The solutions were then stored at the indicated temperatures for the indicated periods of time. The decomposition of the tris(hydroxymethyl)nitromethane at the different pH's, temperatures and time periods was followed by a measurement of the free formaldehyde formed, the colorimetric measurement of the formaldehyde using chromatropic acid reagent being the method of choice. The percentage figures given in the tables show the percent decomposition of the tris(hydroxymethyl)nitromethane in the absence of a stabilizing agent under varying conditions. Samples showing appreciable decomposition gave visible evidence of such, the samples turning various shades of yellow to brown and showing visible evidence of gassing.

TABLE I

*Decomposition of Unstabilized Tris(hydroxymethyl)-nitromethane at 25° C.*

| pH | 8 hrs. | 1 day | 2 days | 3 days | 4 days | 5 days | 6 days | 7 days |
|---|---|---|---|---|---|---|---|---|
| 4.0 | 0.0 | 0.0 | 0.0 | 0.0 | 0.0 | 0.0 | 0.0 | 0.0 |
| 6.0 | 0.0 | 0.0 | 0.0 | 0.0 | 0.0 | 3.0 | 4.5 | 6.0 |
| 6.5 | 4.0 | 5.0 | 6.0 | 8.0 | 9.0 | 10.0 | 11.0 | 12.0 |
| 8.0 | 5.0 | 5.5 | 7.0 | 8.0 | 9.5 | 11.0 | 12.5 | 14.0 |
| 8.5 | 6.0 | 6.0 | 6.5 | 7.0 | 9.5 | 11.5 | 14.0 | 16.0 |
| 9.0 | 9.0 | 9.5 | 10.0 | 11.0 | 12.0 | 14.0 | 16.0 | 18.0 |

TABLE II

*Decomposition of Unstabilized Tris(hydroxymethyl)-nitromethane at 40° C.*

[Percent]

| pH | 8 hrs. | 1 day | 2 days | 3 days | 4 days | 5 days | 6 days | 7 days |
|---|---|---|---|---|---|---|---|---|
| 4.0 | 0.0 | 0.0 | 0.0 | 0.0 | 0.0 | 0.0 | 1.5 | 2.0 |
| 6.0 | 1.5 | 6.0 | 10.0 | 11.0 | 12.0 | 14.0 | 16.0 | 18.0 |
| 7.5 | 10.0 | 14.0 | 24.0 | 30.0 | 31.0 | 32.0 | 36.0 | 39.0 |
| 8.0 | 12.0 | 18.0 | 26.0 | 32.0 | 35.0 | 37.0 | 40.0 | 43.0 |
| 8.5 | 14.0 | 19.0 | 30.0 | 38.0 | 39.0 | 40.0 | 44.0 | 48.0 |
| 9.0 | 15.0 | 23.0 | 34.0 | 39.0 | 42.0 | 43.0 | 46.0 | 50.0 |

TABLE III

*Decomposition of Unstabilized Tris(hydroxymethyl)-nitromethane at 60° C.*

| pH | 8 hrs. | 1 day | 2 days | 3 days | 4 days |
|---|---|---|---|---|---|
| 4.0 | 0.5 | 2.0 | 3.0 | 6.0 | 9.0 |
| 6.0 | 15.0 | 24.0 | 27.0 | 31.0 | 34.0 |
| 7.5 | 31.0 | 48.0 | 54.0 | 57.5 | 62.0 |
| 8.0 | 35.0 | 52.0 | 56.0 | 64.5 | 66.0 |
| 8.5 | 41.0 | 60.0 | 65.0 | 66.5 | 66.0 |
| 9.0 | 44.0 | 62.0 | 66.0 | 66.0 | 66.5 |

From the above, it will be readily seen that tris(hydroxymethyl)nitromethane decomposes under almost all conditions of pH from 4.0 to 9.0 and at all temperatures from 25° C. to 60° C. In order to determine the effectiveness of sodium bisulfite in reducing the decomposition of tris(hydroxymethyl)nitromethane the following experiment was carried out. Three cutting oil solutions were prepared, each containing 10% sodium nitrate, 5% triethanolamine, and 1% tris(hydroxymethyl)nitromethane. The first solution was made up to 100% by the addition of water and used as a control. To the second solution was added 1% sodium bisulfite and sufficient water to make 100%. To the third was added 2% sodium bisulfite and sufficient water to make 100%. The three solutions were then stored at room temperature and visible changes noted after the expiration of different time periods. After 24 hours, the control, solution No. 1, was dark amber in color and was visibily gassing. No change was noted in the solutions No. 2 and No. 3. At the end of 14 days, the control, solution No. 1, was dark brown in color and no longer gassing and the tris(hydroxymethyl)nitromethane appeared to be completely decomposed. Solution No. 2 was slightly yellow in color, but there were still no signs of gassing. Solution No. 3 was completely colorless and apparently unchanged. These solutions were reserved for the bacterial activity test reported below.

A new set of solutions was prepared as follows: Solution No. 4 consisted of 1% tris(hydroxymethyl)nitromethane in buffer at pH 9.0. Solution No. 5 consisted of 1% tris(hydroxymethyl)nitromethane and 1% sodium bisulfite in buffer at pH 9.0. Solution No. 6 consisted of 1% tris(hydroxymethyl)nitromethane, 2% sodium bisulfite in buffer at pH 9.0 and solution No. 7 consisted of buffer solution only at pH 9.0. These four solutions were stored at 60° C. and visible changes noted. At the end of 24 hours, solution No. 4 was yellow-amber in color and gassing. Solutions No. 5, 6 and 7 were unchanged. At the end of six days, solution No. 4 was dark brown in color and gassing, solution No. 5 was light yellow in color with some gassing, solutions No. 6 and 7 were unchanged, still colorless and no gassing. The solutions were also reserved for the bacterial activity test reported below.

Commercial grades of tris(hydroxymethyl)nitromethane slowly decompose on storage and darken in color. The following experiment was run to determine the effectiveness of sodium bisulfite in stabilizing such compositions. Two aqueous solutions of commercial grade tris(hydroxymethyl)nitromethane containing 65% tris(hydroxymethyl)nitromethane in distilled water were prepared. One solution was retained as a control and to the other was added 2% by weight of sodium bisulfite. Both samples were stored at room temperature and examined from time to time. At the end of six months' time the solution containing the sodium bisulfite showed no gassing or increase in color while the control showed an increase in color after two weeks and substantial color and decomposition before the end of the six months observation period.

The following test was run to determine whether stabilized compositions of tris(hydroxymethyl)nitromethane still retained utility as bactericides. The seven numbered solutions described above were next examined at the end of the test periods for bactericidal activity against various microorganisms, with the results shown in the table below.

TABLE IV

The test plates were prepared using an agar-dilution-streak plate method using North Gelatin Agar with the pH adjusted to 8.0. The plates were incubated for 24 hours at 37.5° C.

*Bacterial Activity of Stabilized Tris(hydroxymethyl)Nitromethane*

[Minimum Inhibition Concentration μg./ml.]

| Organism | Solution number | | | | | | |
|---|---|---|---|---|---|---|---|
| | 1 | 2 | 3 | 4 | 5 | 6 | 7 |
| Staphlycoccus aureus | 500–1,000 | 500–1,000 | 1,000 | 250–500 | 250–500 | (1) | (1) |
| Streptococcus faecalis | 500–1,000 | 500–1,000 | 1,000 | 250–500 | 250–500 | (1) | (1) |
| Streptococcus hemolytieus | 500–1,000 | 500–,1000 | 1,000 | 250–500 | 250–500 | (1) | (1) |
| E. coli | 500–1,000 | 500–1,000 | 1,000 | 250–500 | 250–500 | (1) | (1) |
| Past. pseudotuberculosis | 100–251 | 250–500 | 500–1,000 | 250–500 | 250–500 | (1) | (1) |
| Shig. dysenteria | 250–500 | 250–500 | 1,000 | 250–500 | 250–500 | (1) | (1) |
| Mycobacteria sp. 607 | 500–1,000 | 500–1,000 | 500–1,000 | 500–1,000 | 500–1,000 | (1) | (1) |
| Mycobacteria ranae | 500–1,000 | 500–1,000 | 500–1,000 | 500–1,000 | 500–1,000 | (1) | (1) |

1 No inhibition.

From the results reported in Table IV above it is apparent that tris(hydroxymethyl)nitromethane retains its bactericidal activity when stabilized with sodium bisulfite. Sodium bisulfite in the concentrations indicated above is equally effective and satisfactory in stabilizing tris(hydroxymethyl)nitromethane in other forms and in other types of compositions such as other water-oil emulsions, including cutting oils, cosmetic compositions, compositions used in the paper and pulp industry, in the treatment of water for the inhibition of microbiological growth and for other purposes which will be obvious to one skilled in the art.

Now having described my invention, what I claim is:
1. A composition consisting essentially of tris(hydroxymethyl)nitromethane intimately mixed with a minor amount of sodium bisulfite sufficient to inhibit the decomposition of said tris(hydroxymethyl)nitromethane.
2. A composition consisting essentially of tris(hydroxymethyl)nitromethane intimately mixed with 1 to 2% by weight of sodium bisulfite based on the weight of the composition as a stabilizer for said tris(hydroxymethyl)nitromethane.

References Cited in the file of this patent

UNITED STATES PATENTS

| | | |
|---|---|---|
| 2,135,444 | Vanderbilt | Nov. 1, 1938 |
| 2,164,440 | Wyler | July 4, 1939 |
| 2,835,693 | Beaubien | Mar. 4, 1958 |

OTHER REFERENCES

Wheeler et al.: "Bacterial Inhibitors for Cutting Oil," Applied Microbiology, vol. 4, 1956, pages 122–126.

UNITED STATES PATENT OFFICE
CERTIFICATE OF CORRECTION

Patent No. 3,024,202                         March 6, 1962

Lawrence R. Jones

It is hereby certified that error appears in the above numbered patent requiring correction and that the said Letters Patent should read as corrected below.

Column 1, line 33, after "compositions." insert -- The effective use of the material in such compositions, --; line 39, for "is", second occurrence, read -- in --; column 2, line 29, for "compositions" read -- composition --.

Signed and sealed this 4th day of September 1962.

(SEAL)
Attest:

ERNEST W. SWIDER
Attesting Officer

DAVID L. LADD
Commissioner of Patents